(No Model.)
J. H. LYLES & E. C. WARD
HUB ATTACHING DEVICE.
No. 410,983. Patented Sept. 10, 1889.
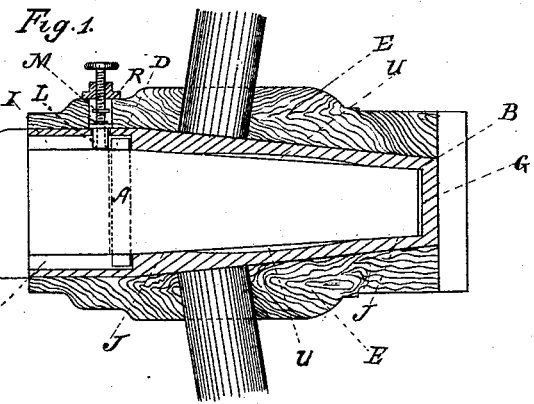
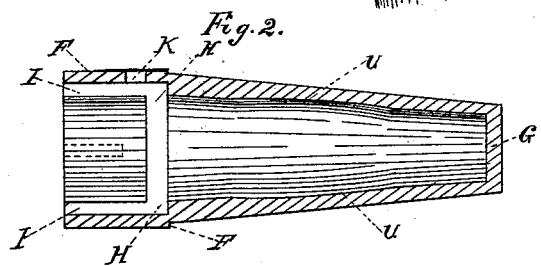
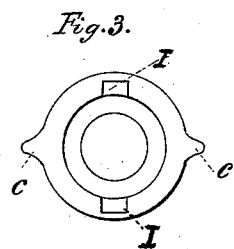
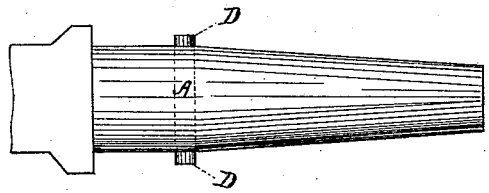
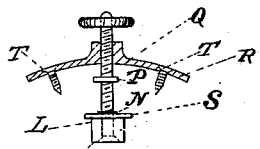
Witnesses
A. M. Tyler
A. G. Thurman
Inventors
John Henry Lyles
Edward Clark Ward
By their Attorney
E. C. Ward
N. PETERS, Photo-Lithographer, Washington, D. C.

UNITED STATES PATENT OFFICE.

JOHN HENRY LYLES AND EDWARD CLARK WARD, OF PARSONS, KANSAS.

HUB-ATTACHING DEVICE.

SPECIFICATION forming part of Letters Patent No. 410,983, dated September 10, 1889.

Application filed September 17, 1888. Serial No. 285,601. (No model.)

*To all whom it may concern:*

Be it known that we, JOHN HENRY LYLES and EDWARD CLARK WARD, citizens of the United States, residing at the city of Parsons, in the county of Labette and State of Kansas, have jointly invented a new and Improved Hub-Fastening Device and Axle Box, of which the following is a specification.

Our invention relates to improvements in hub-fastening devices and axle-boxes. Ordinarily the axle-boxes in hubs are open at both ends and the hub is fastened on by turning a female nut onto the threaded end of a spindle or skein, to which the following objections exist:

First. A wrench or other separate instrument is required to turn the nut onto and off the spindle.

Second. Sometimes the nut is turned on too tight and crowds the hub against the shoulder of the axle, thus making it harder to revolve the hub, and thereby increasing the draft on the team. This tightening of the hub causes the unnecessary wearing out of washers and grinding off of the shoulders of wagon skeins and axles.

Third. Wagons and buggies are frequently run too far without oiling, and thus the spindles are heated so that their expansion tightens the nuts so tight that the wagons or buggies must be taken to a blacksmith to have the nuts taken off. Sometimes nuts come off voluntarily, especially while the wagon is backing, and are lost.

Fourth. Serious injuries to persons and great damages have resulted from the loss of nuts and the consequent running off of wheels.

Fifth. Dirt and sand work into an axle-box around the nut and cut or grind the spindle and axle-box and increase the friction therein.

Sixth. Wheel-grease runs out of the axle-box around the nuts and is wasted, and keeps the nuts and outer end of the hubs filthy, especially on farm-wagons. Who has handled an ordinary buggy or wagon without being "afraid of wheel-grease?"

The objects of our invention are to overcome every one of the objections aforesaid and to provide a clean, convenient, reliable, and durable hub-fastening device and axle-box, which fastening device can be unfastened or securely fastened by simply turning a thumb-piece or screw-lever around two or three times, which takes less time than is required to operate any other hub-fastening device. We attain these objects by the mechanism shown in the accompanying drawings, in which similar letters refer to similar parts throughout the drawings.

Figure 1 is a view of a longitudinal section of half of a hub, axle-box, spindle, and the screw-lever and lock-bolt, in which A is the pin through the spindle to form two lugs D D on the spindle. B is the space between the end of the spindle and the closed or solid end of the axle-box for the head of a lag-bolt, and also to hold oil. When no lag-bolts are used, this space B may be partly filled with washers, if desired, although the end of the spindle can never touch the end of the axle-box. E is the hub. I I indicate the longitudinal grooves running from the end of the axle-box to the continuous groove H, to admit the projecting ends D D of pin A, or other lugs, into continuous groove H, (shown in Fig. 2,) and which runs around the inside of the axle-box. Lugs D D operate in continuous groove H as the hub revolves over them. J J indicate the place of contact or bearings between the axle-box and spindle. L is the lock-bolt which closes the inner end of one of the longitudinal grooves, and thus prevents lugs D D from working out of the continuous groove H. M is the rod of the screw-lever which extends through the lock-bolt, its lower end being spread to form a head at the lower end of the lock-bolt to enable it to turn in the lock-bolt, something like a swivel in the lock-bolt L, to raise or lower the lock-bolt out of or into the longitudinal groove I. R is the plate on the hub, which is countersunk on the side of the hub and is thickest in its center, where it has a threaded hole through it, in which the threaded lever-rod M of the screw-lever operates as the thumb-piece on the upper end of it is turned. Any thumb-piece may be used on this rod to turn it.

Fig. 2 is a longitudinal section of half of the axle-box, in which F shows the end of the axle-box re-enforced or thickened to strengthen it over the grooves. U U show depressions in the axle-box to lessen friction and hold oil, as shown in Fig. 1. K is an opening through the side of the axle-box for lock-bolt L to operate through in closing longitudinal groove I, as aforesaid.

Fig. 3 is a view of the end of the axle-box, in which I I show the ends of the longitudinal grooves, and C C are ribs to hold the axle-box from turning in the hub.

Fig. 4 is a view of an axle-spindle with pin A through it, the projecting ends of the pin forming two lugs D D; but lugs may be made otherwise on the spindle in lieu of pin A.

Fig. 5 is a view of the screw-lever, lock-bolt, plate, and the thumb-piece, in which L is the lock-bolt. O is the spread end or head of the lever-rod to lift the lock-bolt. N is a shoulder of the lever-rod resting against the top of the lock-bolt to press the lock-bolt down into the longitudinal groove. P is a shoulder on the lever-rod, which will, when turned outward, hit the under side of plate 2, and thus prevent lock-bolt L from being raised too far, and also prevent the threads of the lever being strained. S is an extension of the lock-bolt to form a shoulder to prevent its going too far into the axle-box, and T T are screws to fasten the plate to the hub.

When the hub is on the spindle and is pressed against the shoulder of the axle or spindle, the pin through the spindle or lugs D D should register with the center of continuous groove H, which runs around the inside of the axle-box, so as to leave a space or play between each side of the groove and the lugs not exceeding one-sixteenth of an inch, thus making this groove in farm-wagons about one-eighth of an inch wider than the diameter of the lugs. We prefer allowing the same play at the bearings J J, between the axle-box and spindle, that is allowed the lugs D D in the continuous groove H, so that when the hub is off of a level the space at the bearings between the axle-box and spindle will be taken up, and thus bind the axle-box and spindle together before the lugs D D have taken up their play in the groove. To illustrate, if the height of the lugs is only one-eighteenth of the length of the spindle, their play being the same, the play between the axle-box and spindle will be taken up when only about one-eighteenth of the play between the lugs and the sides of the continuous groove has been taken up; also allow a space of about one thirty-second part of an inch between the ends of the lugs or pins and the bottom of the grooves to prevent friction and the wearing of the grooves. Inasmuch as lugs D D register with the center of the continuous groove when the hub is against the axle they can never touch the side of the groove toward the axle, and so long as wheels run to the center or to the shoulder of the axle the only way the lugs D D can ever touch the other side of the continuous groove is by the side of the groove glancing against the lugs while the hub is being drawn outward by a spiral movement of the hub on the spindle—as when the wheel is sliding into or being drawn out of a frozen rut; but the friction on and wearing of the lugs would be insignificant, because the lugs are constantly covered with and lubricated by the oil in the groove. These lugs will wear longer than any axle-box or spindle; but if for any reason another pin should be required, expand the spindle by warming it a little, then drive out the old pin and insert a new one, so that it is tight, and as the spindle cools it will shrink to the pin and be as firm and strong as if there had been no hole through the spindle. The oil in the longitudinal grooves I I works out into and lubricates that part of the shoulder of the axle or spindle against which the hub rubs while revolving; but none runs out or is wasted. The lock-bolt L, when down in the longitudinal groove I, must have its side toward the continuous groove just exactly flush with the side of continuous groove H, so that the side of the continuous groove shall present a solid smooth surface, including the side of the lock-bolt. By turning the screw-lever, which may be done by simply turning the thumb-piece in the side of the hub, or otherwise, said lock-bolt L is lowered into the longitudinal groove flush with the side of the continuous groove, and securely locks said lugs D D in continuous groove H, and thus fastens the hub. By simply turning the screw-lever the reverse way the lock-bolt is drawn up out of said longitudinal groove, and thus the hub is unfastened, so that it can be taken off of the spindle.

We are aware that prior to our invention axle-boxes have been made with the outer end closed or cast solid, and that spindles have been made with a hole and linchpin through them at their ends outside of the part on and around which the hub revolved, and do not claim them as our invention; but What we do claim as our invention, and desire to secure to ourselves as joint inventors by Letters Patent, is—

1. In an axle-box, the combination of a continuous groove around the inside of an axle-box with one or more grooves running from the said continuous groove to the end of the axle-box, adapted to admit lugs made or put on a spindle, or to admit the ends of a pin extending through a spindle and forming pins or lugs thereon, and also adapted for conducting oil or other lubricator from an axle-box to and lubricating the shoulder of a spindle or axle, against which the hub rubs while revolving.

2. The combination of a screw-lever mounted on the side of a hub with a lock-bolt to be operated through the side of an axle-box and hub, or either of them, whereby when said screw-lever is turned the said lock-bolt is pressed into or drawn out of a groove or other opening, substantially as and for the purpose hereinbefore specified.

3. In a hub-fastening device, the combination, with a spindle having lugs thereon, or having a pin through it to form one or more lugs thereon, of an axle-box having a continuous groove around its inside, with one or more longitudinal grooves running from said continuous groove to the end of the axle-box, adapted to let the axle-box pass over said lugs and admit said lugs into said continuous groove to operate therein as the hub revolves over them around the spindle, and having a hole through the side of the axle-box, and with a screw-lever mounted on the side of the hub, and connected with a lock-bolt and operated through the side of the hub and axle-box, or through either of them, by simply turning said screw-lever, whereby the said lock-bolt is lowered into the axle-box and securely locks said lugs in said continuous groove, and thus fastens the hub, or whereby by simply turning said screw-lever the reverse way said lock-bolt is drawn out, and thus the hub is unfastened, so that it can be pulled off of the spindle, substantially as and for the purpose specified.

JOHN HENRY LYLES.
EDWARD CLARK WARD.

Witnesses:
JAMES HEACOCK,
ADONIRAM CANE.